United States Patent
Hamdoon et al.

(10) Patent No.: US 9,855,972 B2
(45) Date of Patent: Jan. 2, 2018

(54) VEHICLE ROOF WITH TRUSS STRUCTURE

(71) Applicant: Ford Global Technologies, LLC, Dearborn, MI (US)

(72) Inventors: Muhsin M. Hamdoon, Windsor (CA); Marwan Ahmad Elbkaily, Canton, MI (US); Viktor Kostrominov, Melvindale, MI (US); Darrin Neil Wagner, Bloomfield Hills, MI (US); Edgar Edward Donabedian, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 14/688,160

(22) Filed: Apr. 16, 2015

(65) Prior Publication Data

US 2016/0304129 A1    Oct. 20, 2016

(51) Int. Cl.
*B62D 25/06* (2006.01)
*B62D 21/15* (2006.01)
*B62D 25/04* (2006.01)

(52) U.S. Cl.
CPC ........... *B62D 21/157* (2013.01); *B62D 25/04* (2013.01); *B62D 25/06* (2013.01)

(58) Field of Classification Search
CPC ...... B62D 21/157; B62D 25/04; B62D 25/06; B62D 23/005
USPC .......... 296/210, 187.13, 193.12, 29, 30, 205
See application file for complete search history.

(56) References Cited

U.S. PATENT DOCUMENTS

| | | | | |
|---|---|---|---|---|
| 2,122,444 | A | * | 7/1938 | Tjaarda ................. B62D 23/00 296/203.01 |
| 3,292,726 | A | | 12/1966 | Jette, Jr. |
| 4,136,985 | A | * | 1/1979 | Taul ..................... B60R 21/131 280/756 |
| 4,327,938 | A | * | 5/1982 | Geissler ............... B62D 21/152 280/784 |
| 4,695,342 | A | * | 9/1987 | Belleau ................. B29C 53/564 156/173 |
| 4,917,435 | A | * | 4/1990 | Bonnett ................ B62D 29/00 296/190.08 |
| 5,167,481 | A | * | 12/1992 | Gotz .................... B66F 9/07545 280/756 |
| 6,315,351 | B1 | * | 11/2001 | Mondragon Sarmiento ............. B62D 33/06 180/89.19 |
| 7,048,082 | B2 | * | 5/2006 | Mori .................... B62D 23/005 180/311 |
| 7,556,116 | B2 | * | 7/2009 | Ootani ................ B60R 21/0136 180/274 |
| 7,625,040 | B2 | | 12/2009 | Pollak et al. |

(Continued)

FOREIGN PATENT DOCUMENTS

DE    102011114662    *    4/2013    ............ B62D 25/06
DE    102012023568 A1    6/2014

(Continued)

*Primary Examiner* — Jason S Morrow
*Assistant Examiner* — E Turner Hicks
(74) *Attorney, Agent, or Firm* — Jason C. Rogers; Brooks Kushman P.C.

(57) ABSTRACT

A vehicle roof support structure including a pair of reinforcing truss members. The roof support structure includes a header, a roof bow, right and left roof rails, and a center roof support. The trusses form triangular reinforcing structures on the driver-side and passenger-side.

19 Claims, 4 Drawing Sheets

(56) References Cited

U.S. PATENT DOCUMENTS

| | | | | |
|---|---|---|---|---|
| 7,631,927 | B2 * | 12/2009 | Ayabe | B60R 21/11 |
| | | | | 296/190.08 |
| 8,678,479 | B2 * | 3/2014 | Jaynes | B62D 25/06 |
| | | | | 29/897.2 |
| 2010/0140984 | A1 | 6/2010 | Murray | |
| 2010/0314911 | A1 | 12/2010 | Morgans et al. | |
| 2011/0104413 | A1 | 5/2011 | Mendibourne et al. | |
| 2012/0256445 | A1 | 10/2012 | Baccouche et al. | |
| 2013/0057018 | A1 | 3/2013 | Reese | |
| 2013/0320716 | A1 | 12/2013 | Nishimura et al. | |
| 2014/0300139 | A1 | 10/2014 | Toni | |

FOREIGN PATENT DOCUMENTS

| | | |
|---|---|---|
| JP | 2007230408 A | 9/2007 |
| KR | 20020080608 A | 10/2002 |
| WO | 2013041177 A1 | 3/2013 |
| WO | 2014034586 A1 | 3/2014 |

\* cited by examiner

US 9,855,972 B2

VEHICLE ROOF WITH TRUSS STRUCTURE

TECHNICAL FIELD

This disclosure relates to reinforcements for vehicle roofs.

BACKGROUND

Vehicles are designed with a view to reducing the mass of the vehicle but all prevailing vehicle tests must be met for a design to be acceptable. One vehicle test is FMVSS 214 that is the 20 MPH Oblique Pole Side Impact Test. The roof outer panel may separate from the supporting roof structure as a result of the test which would be an unsatisfactory result of the test. This disclosure is directed to providing a roof structure that resists separation of the outer roof panel from the roof supporting structure in the 20 MPH Oblique Pole Side Impact Test.

This problem and other problems are addressed by this disclosure as summarized below.

SUMMARY

According to one aspect of this disclosure, a roof structure is disclosed for supporting a roof panel for a vehicle. The roof structure includes a transversely extending header and a transversely extending roof bow spaced from the header. A right roof rail and a left roof rail extend between the header and the roof bow on opposite lateral sides of the roof. A truss member is secured to a corner formed by the roof bow and one of the roof rails that extends to a central portion of the header.

According to another aspect of this disclosure, the roof structure supports a roof panel for a truck cab. The roof structure includes the header, the roof bow and right and left roof rails. A passenger-side truss member is secured to a corner formed by the roof bow and the right roof rail and extends to a central portion of the header. A driver-side truss member is secured to a corner formed by the roof bow and the left roof rail and extends to the central portion of the header.

According to an additional aspect of this disclosure, the roof structure for supporting a roof panel of a vehicle that includes the header, the roof bow, the right and left roof rails, and a longitudinally extending center roof support bar that extends from a central location on the roof bow to a central location on the header. The truss member extending between the header and the roof bow and between one of the roof rails and the center roof support forms a first triangular reinforcing structure including the header, the truss member and the one of the roof rails and also forms a second triangular reinforcing structure including the header, the truss member and the center roof support.

The aspects of this disclosure, as summarized above, may include additional innovative aspects. The truss member may be a driver-side truss member secured to the left roof rail and the roof structure may further comprise a passenger-side truss member secured to the right roof rail and the roof bow that extends to the central portion of the header. The truss may form a triangular shaped reinforcement including the truss member, a portion of the header between a centerline of the roof structure and a portion of one of the roof rails disposed between the roof bow and the header. The triangular shaped reinforcements function to resist deformation of the roof structure causing a diagonal elongation of the roof structure.

According to other aspects of this disclosure, the structure may further include a door opening panel assembly that extends around a door, wherein the door opening panel assembly includes a door opening inner panel that is attached to a B-pillar. The door opening inner panel may be secured to one of the roof rails and the roof bow. The header may be connected to one of the roof rails by a bracket disposed adjacent an A-pillar of the vehicle.

The roof structure may further comprise a longitudinally extending center roof support bar that extends from a central location on the roof bow to a central location on the header. The truss member may be secured to the header adjacent the center roof support. The disclosed roof structure is effective in keeping the roof panel secured to the roof structure in a side collision with a pole-shaped barrier.

In at least one embodiment, the truss is a driver-side truss member secured to the left roof rail and further comprises a passenger-side truss member extending between the header and the roof bow and between the right roof rail and the center roof support. The passenger-side truss forms a third triangular reinforcing structure including the header, the truss member and the right roof rail. A fourth triangular reinforcing structure is formed by the passenger-side truss member that involves the header, the truss member and the center roof support. The triangular reinforcing structures resist diagonal elongation of the roof structure.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
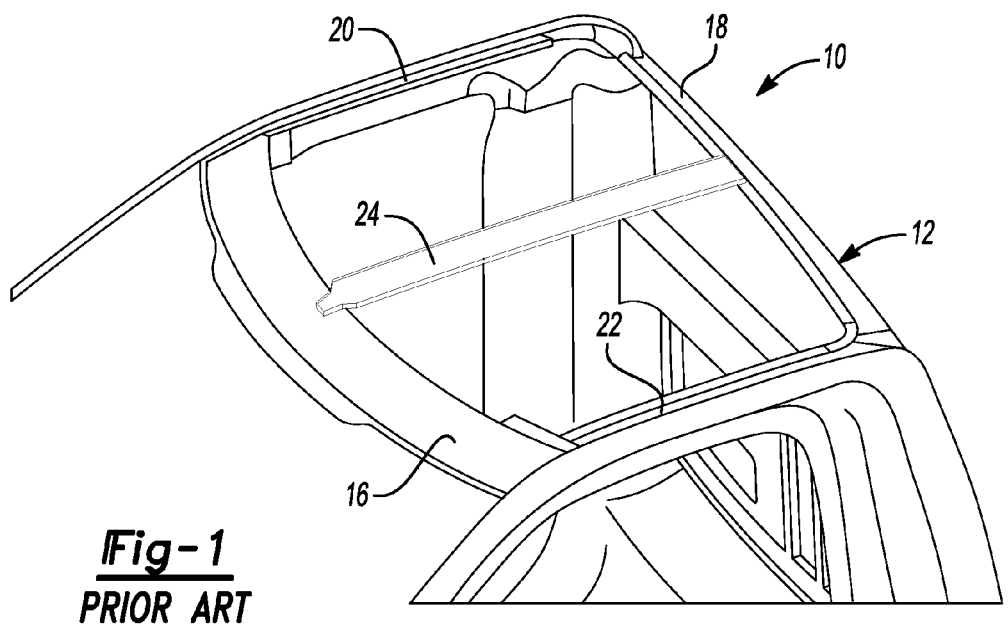
FIG. 1 is a fragmentary perspective view of a prior art roof support structure for a pick-up truck.

Referring to FIG. 1, a vehicle 10 is illustrated that includes a truck roof structure 12 made according to the prior art. The truck roof structure 12 includes a header 16, or windshield header, and a roof bow 18 that is spaced behind the header 16 and extends generally parallel to the header 16 in the transverse vehicle direction. The header 16 and roof bow 18 are joined by a right roof rail 20 and a left roof rail 22. A center roof support 24 extends in the longitudinal vehicle direction from the header 16 rearwardly to the roof bow 18.

Figure 2:
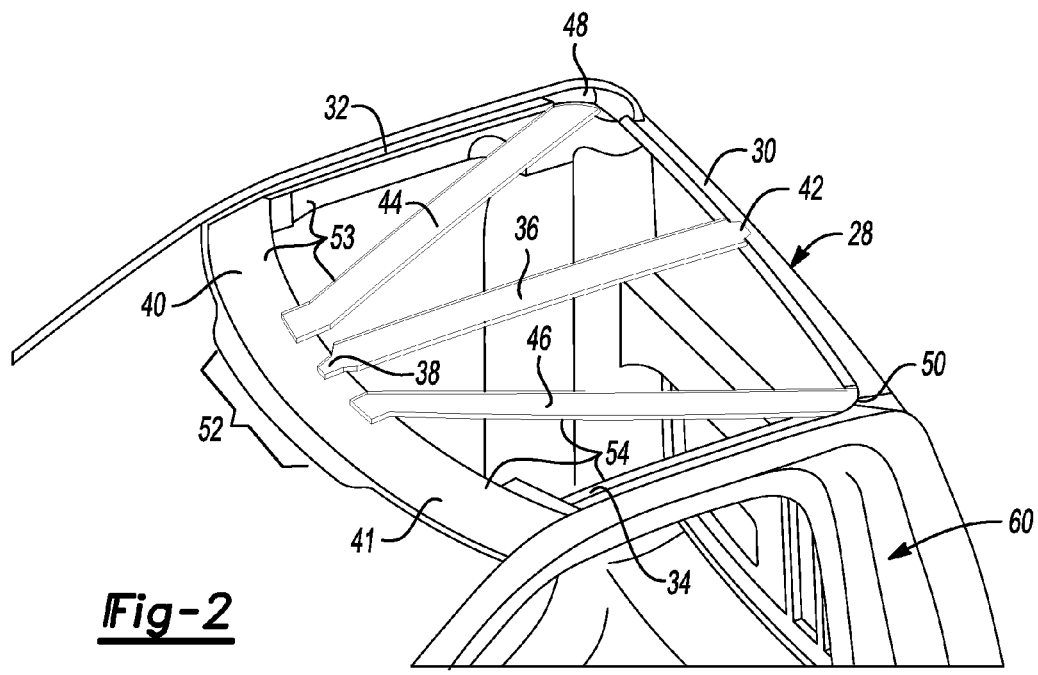
FIG. 2 is a fragmentary perspective view of the improved roof structure for a pick-up truck made according to this disclosure.

Referring to FIG. 2, a truck roof structure 28 is illustrated that is made according to the teachings of this disclosure. The roof structure 28 includes a roof bow 30 that extends between a right roof rail 32 and a left roof rail 34. A center roof support 36 is connected to a central location 38 on a header 40 and a central location 42 on the roof bow 30.

A passenger-side truss member 44 and a driver-side truss member 46 are attached to the roof structure 28 at a first rear corner 48 formed by the right roof rail 32 and the roof bow 30. The driver-side truss member 46 extends from a second rear corner 50 formed by the left roof rail 34 and the roof bow 30. A central portion 52 of the header 40 is defined as the portion of the header 40 within eight inches of the centerline of the center roof support 36 and the centerline of the vehicle.

The passenger-side truss member 44 is secured to the roof structure 28 so that a first triangular reinforcing structure 53 is formed by the passenger-side truss member 44, the right roof rail 32 and the portion of the header 40 between the center roof support 36 and the right roof rail 32. A second triangular reinforcing structure 54 is formed by the driver-side truss member 46, the left roof rail 34 and the portion of the header 41 between the center roof support 36 and the left roof rail 34.

The first and second triangular reinforcing structures 53 and 54 prevent diagonal elongation of the roof structure and roof panel in the 20 MPH Oblique Pole Side Impact Test according to FMVSS 214. The truss members 44 and 46 are shown extending from the rear corners 48 and 50 to the central portion 52 of the header 40. As an alternative, the truss members 44 and 46 could also be arranged to extend from the intersection of the header 40 and the respective roof rails 32 and 34 to the central location 42 on the roof bow 30. In either arrangement, the triangular reinforcing structures 53 and 54 function to prevent match-boxing of the roof structure and diagonal elongation in a side impact collision.

The roof rails on both sides of the vehicle are secured to a door opening panel (DOP) 60. The DOP 60 is oriented to receive the vehicle door (not shown). The truss members 44 and 46 are connected—directly or indirectly—to the DOP 60. When referring to the connection of the passenger-side truss member 44 and driver-side truss member 46 to the right and left roof rails 34 and 32, it should be understood that the DOP 60 may include a structure adapted to be joined to the truss members 44 and 46.

Figure 3:
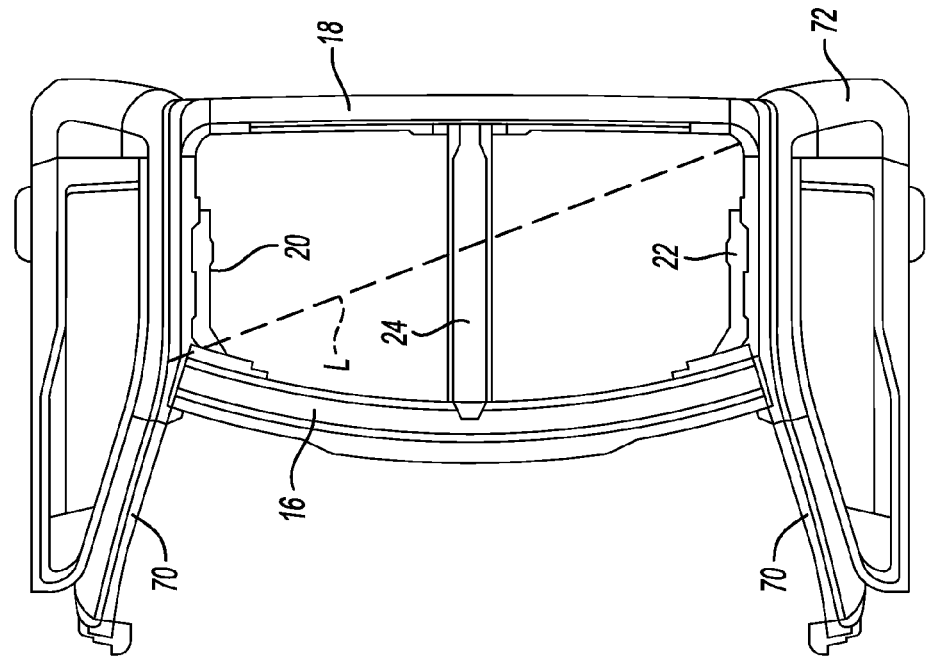
FIG. 3 is a fragmentary top plan view of a roof support structure as shown in FIG. 1 and as tested in the 20 MPH Oblique Pole Side Impact Test.

Referring to FIG. 3, the prior art roof structure 12 is shown to include the header 16 and roof bow 18. The right roof rail 20 and left roof rail 22 extend between the header 16 and the roof bow 18 on opposite lateral sides of the vehicle 10. A diagonal dashed line "L" is shown in FIG. 3 that extends from the B-pillar 72 on the driver side to the A-pillar on the passenger side. Measurement of the diagonal elongation of the roof structure 12 is taken along the diagonal line "L" in FIG. 3.

Figure 6:
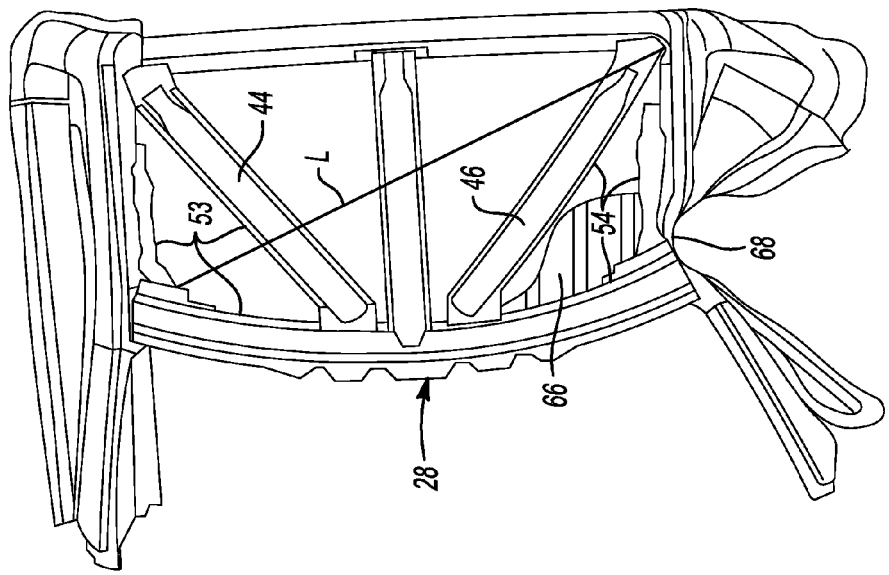
FIG. 6 is a fragmentary top plan view of a roof support structure as shown in FIG. 2 after a collision with an oblique pole in a 20 MPH Oblique Pole Side Impact Test.

Referring to FIG. 6, a roof panel 66 is shown disposed on the roof structure 28. The roof panel 66 may be an aluminum alloy sheet. An area of collision deformation 68 is shown that is a result of a simulation of a test of the roof structure 28 including the passenger-side truss member 44 and the driver-side truss member 46 pursuant to FMVSS 214. The impact is shown to be applied at the roof rail 34 nearer to the A-pillar 70 than the B-pillar 72.

Figure 4:
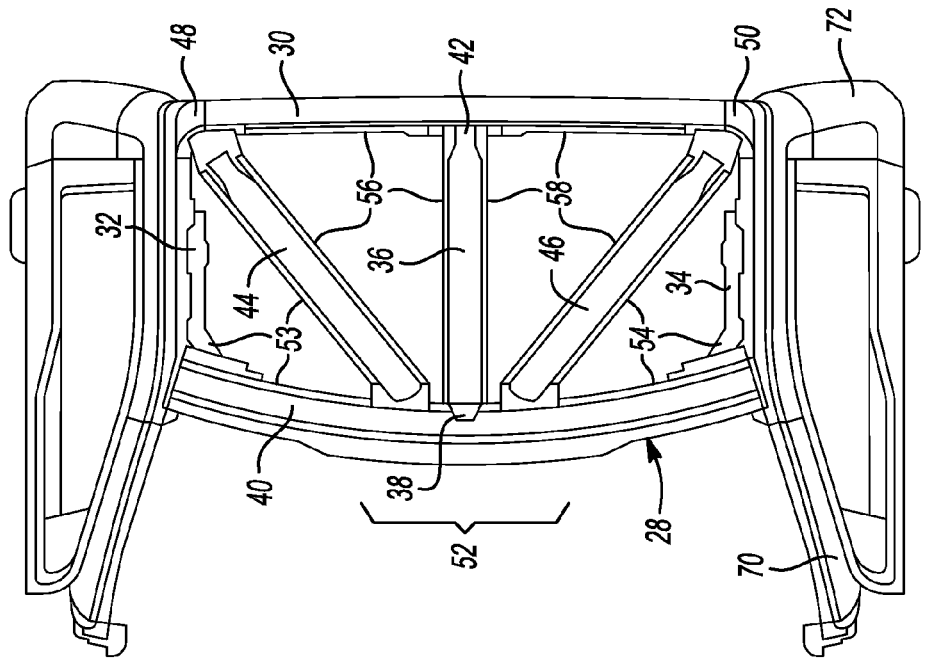
FIG. 4 is a fragmentary top plan view of a roof support structure as shown in FIG. 2 and as tested in the 20 MPH Oblique Pole Side Impact Test.

Referring to FIG. 4, the disclosed roof structure 28 is shown to include a passenger-side truss member 44 and a driver-side truss member 46. The passenger-side truss member 44 forms a first triangular reinforcing structure 53 with the header 40 and the right roof rail 32 and a third triangular reinforcing structure 56 with the center roof support 36 and the roof bow 30. The driver-side truss member 46 forms a second triangular reinforcing structure 54 with the left roof rail 34 and the header 40 and a fourth triangular reinforcing structure 58 with the center roof support 36 and the roof bow 30. The center roof support 36 extends from the central location 38 on the header 40 to the central location 42 on the roof bow 30.

Figure 5:
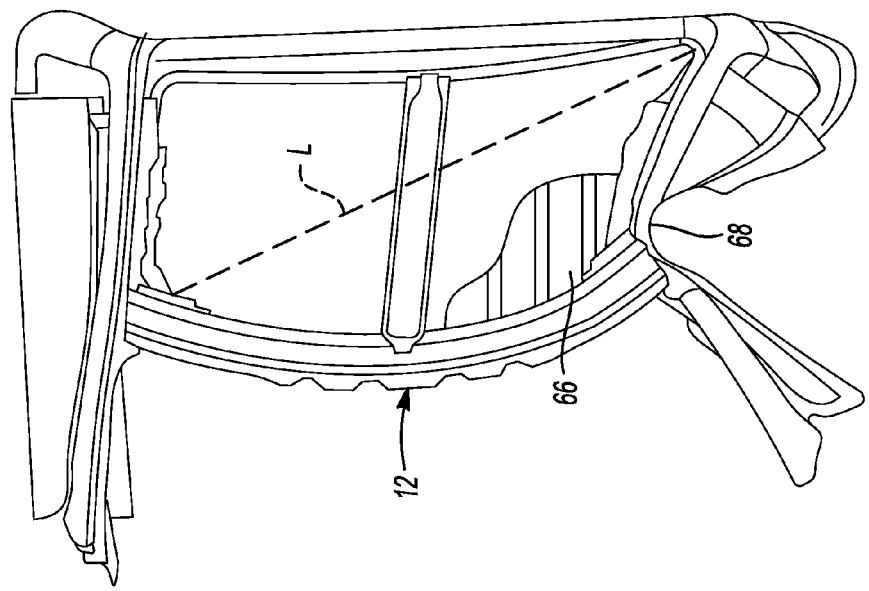
FIG. 5 is a fragmentary top plan view of the prior art roof support structure after a collision with an oblique pole in a 20 MPH Oblique Pole Side Impact Test.
Figure 7:
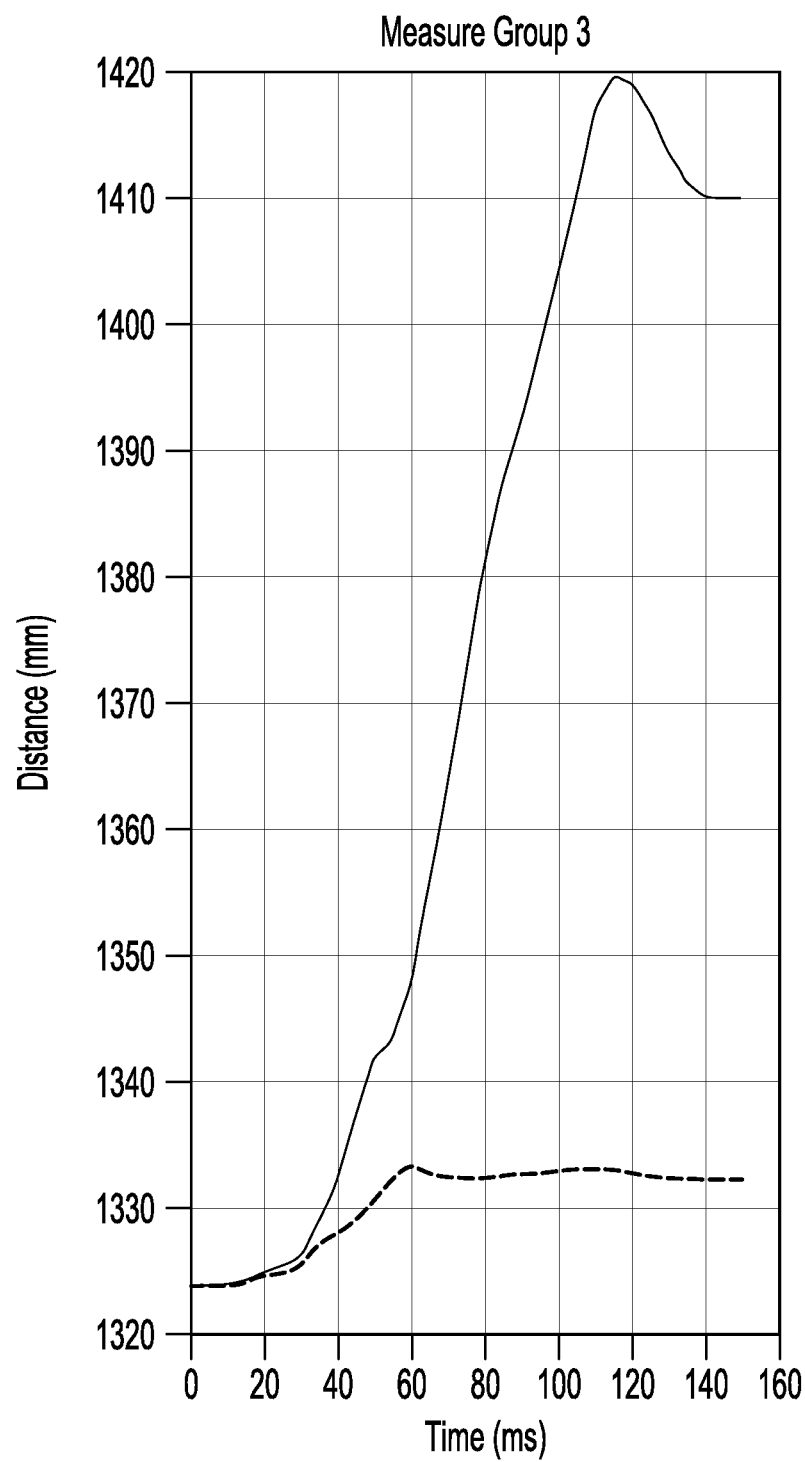
FIG. 7 is a chart showing the diagonal elongation of the prior art roof structure shown in FIG. 4 compared to the disclosed roof structure as shown in FIG. 5.

Referring to FIGS. 5-7, a prior art roof structure in FIG. 5 is shown next to a roof structure including truss members 44, 46 in FIG. 6 that are compared in the chart of FIG. 7. The chart compares the diagonal elongation of the roof along the line "L" shown in FIGS. 5 and 6 that extends diagonally across the roof structure. The test is a computer generated simulation that simulates a comparison of the expected deformation and diagonal elongation of the roof structure shown in FIGS. 5 and 6. The dashed line "L" in FIG. 5 shows the diagonal elongation of the roof structure 12 increasing about 96 mm as a result of the test, while the solid line "L" in FIG. 6 shows the expected deformation diagonally with the disclosed truss roof structure 28. In FIG. 6, the estimated diagonal elongation is shown to be approximately 10 mm in the course of the test. The prior art diagonal elongation causes high diagonal tensile stress on the roof panel 66 and leads to cracking in the struck side corner that propagates longitudinally and transversely. The reduction in diagonal elongation of approximately 86 mm in the simulated test significantly improves the performance of the roof structure and prevents the roof panel 66 from opening in the course of the FMVSS 214—20 MPH Oblique Pole Side Impact Test. If the roof opens in the course of the test, the test is deemed to be a failure. The reinforcement provided by the first and second triangular reinforcing structures 53 and 54 also reduce splits and cracks and intrusion into the passenger compartment as tested.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A roof structure supporting a roof panel for a vehicle comprising:
   a transverse front header;
   a transverse rear roof bow rearwardly spaced from the header;
   a right roof rail and a left roof rail extending between the header and the roof bow on opposite lateral sides of the roof; and
   a truss member secured to a corner formed by the roof bow and one roof rail and secured to a central portion of the header.

2. The roof structure of claim 1 wherein the truss is a driver-side truss member secured to the left roof rail and wherein the roof structure further comprises a passenger-side truss member secured to the right roof rail and the roof bow and that extends to the central portion of the header.

3. The roof structure of claim 1 wherein the truss forms a triangular shaped reinforcement including the truss member, a portion of the header between a centerline of the roof structure and a portion of one of the roof rails disposed between the roof bow and the header.

4. The roof structure of claim 3 wherein the triangular shaped reinforcement resists deformation of the roof structure causing a diagonal elongation of the roof structure.

5. The roof structure of claim 1 further comprising a door opening panel that extends around a door, wherein the door opening panel is attached to a B-pillar and is secured to one of the roof rails and the roof bow.

6. The roof structure of claim 1 wherein the header is connected to one of the roof rails by a bracket disposed adjacent an A-pillar of the vehicle.

7. The roof structure of claim 1 further comprising a longitudinally extending center roof support bar that extends from a central location on the roof bow to a central location on the header, and wherein the truss member is secured to the header adjacent the center roof support.

8. The roof structure of claim 1 wherein the roof panel remains secured to the roof structure in a side collision with a pole-shaped barrier.

9. A roof structure for supporting a roof panel for a truck cab comprising:
   a transversely extending windshield header at a front of the roof structure;
   a transversely extending roof bow rearwardly spaced from the windshield header;
   a right roof rail and a left roof rail extending between the windshield header and the roof bow on opposite lateral sides of the roof panel; and
   a passenger-side truss member secured to a corner formed by the roof bow and the right roof rail and extending to a central portion of the windshield header;
   a driver-side truss member secured to a corner formed by the roof bow and the left roof rail and extending to the central portion of the windshield header; and
   a longitudinally extending center roof support bar is connected to a central location on the roof bow and is connected to a central location on the windshield header, each of the truss members is secured to the windshield header adjacent the center roof support.

10. The roof structure of claim 9 wherein each of the trusses form a triangular shaped reinforcement including one of the truss members, a portion of the windshield header between a centerline of the roof structure and a portion of one of the roof rails disposed between the roof bow and the windshield header.

11. The roof structure of claim 10 wherein the triangular shaped reinforcements are adapted to resist deformation of the roof structure causing a diagonal elongation of the roof structure.

12. The roof structure of claim 9 further comprising a first door opening panel and a second door opening panel, wherein the door opening inner panel is secured to one of the roof rails and the roof bow.

13. The roof structure of claim 9 wherein the windshield header is connected to one of the roof rails by a bracket disposed adjacent an A-pillar of the truck cab.

14. The roof structure of claim 9 further comprising a longitudinally extending center roof support bar that extends from a central location on the roof bow to a central location on the windshield header, and wherein each of the truss members is secured to the windshield header adjacent the center roof support.

15. A roof structure for supporting a roof panel of a vehicle comprising:
   a transversely extending header at a front of the roof structure;
   a transversely extending roof bow rearwardly spaced from the header;
   a right roof rail and a left roof rail extending between the header and the roof bow on opposite lateral sides of the roof panel;
   a longitudinally extending center roof support bar that extends from a central location on the roof bow to a central location on the header; and
   a truss extending between the header and the roof bow and between one of the roof rails and the center roof support bar to provide:
      a first triangular reinforcing structure including the header, the truss member and the one of the roof rails, and
      a second triangular reinforcing structure including the header, the truss member and the center roof support.

16. The roof structure of claim 15 wherein the truss is a driver-side truss member secured to the left roof rail and wherein the roof structure further comprises a passenger-side truss member extending between the header and the roof bow and between the right roof rail and the center roof support bar to provide:
   a third triangular reinforcing structure including the header, the truss member and the right roof rail, and
   a fourth triangular reinforcing structure including the header, the truss member and the center roof support.

17. The roof structure of claim 15 wherein the triangular reinforcing structures resist diagonal elongation of the roof structure.

18. The roof structure of claim 1 wherein the front header is adjacent a windshield.

19. The roof structure of claim 1, wherein the front header is closer to a front windshield than the rear roof bow.

* * * * *